(12) United States Patent
Lipinski et al.

(10) Patent No.: US 9,152,492 B2
(45) Date of Patent: Oct. 6, 2015

(54) PERFORMING RECOVERY OF A HEADLESS COMPUTER

(75) Inventors: Greg J. Lipinski, Loveland, CO (US); Paul A. Boerger, Loveland, CO (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 1363 days.

(21) Appl. No.: 12/574,946

(22) Filed: Oct. 7, 2009

(65) Prior Publication Data
US 2011/0083004 A1    Apr. 7, 2011

(51) Int. Cl.
*G06F 11/00* (2006.01)
*G06F 11/07* (2006.01)

(52) U.S. Cl.
CPC ........ *G06F 11/0793* (2013.01); *G06F 11/0727* (2013.01); *G06F 11/0748* (2013.01)

(58) Field of Classification Search
CPC . G06F 9/4416; G06F 9/4401; G06F 11/0793; G06F 21/572; G06F 21/575; G06F 9/4408; G06F 11/0748; G06F 11/1469; G06F 11/1417
USPC .................. 714/4.4, 4.3, 6.31, 36; 713/1, 2
See application file for complete search history.

(56) References Cited

U.S. PATENT DOCUMENTS

| 7,930,533 | B1* | 4/2011 | Guo et al. ........................ 713/2 |
| 2003/0081620 | A1* | 5/2003 | Danner et al. ............... 370/400 |
| 2003/0188176 | A1* | 10/2003 | Abbondanzio et al. ....... 713/191 |
| 2004/0044889 | A1* | 3/2004 | Kamataki ......................... 713/2 |
| 2006/0242400 | A1* | 10/2006 | Anderson et al. ................. 713/2 |
| 2007/0008922 | A1* | 1/2007 | Abhishek et al. ............. 370/329 |
| 2008/0183812 | A1* | 7/2008 | Paul et al. ..................... 709/203 |

OTHER PUBLICATIONS

Setting up a PXE-Boot Server by Net Llama!, www.linux-sxs.org, Nov. 9, 2007.*
Neoware Flash Recovery Using PXE dated Jun. 30, 2003 (3 pages).
http://www.debian-administration.org/articles/478 "Setting up a Server for PXE Network Booting," Dec. 22, 2006 (18 pages).
Wikipedia, "Preboot Execution Environment" dated on or before Aug. 13, 2009 (4 pages).
Intel Corporation, "Preboot Execution Environment (PXE) Specification" Version 2.1 dated Sep. 20, 1999 (103 pages).

* cited by examiner

*Primary Examiner* — Jason Bryan
(74) *Attorney, Agent, or Firm* — Trop, Pruner & Hu, P.C.

(57) ABSTRACT

To perform recovery of a headless computer, a direct connection is established by the headless computer with a recovery computer over a network link. After establishing the direct connection, the headless computer is initiated in recovery mode. The headless computer receives a recovery routine from the recovery computer, and the recovery routine is executed in the headless computer to implement a procedure to receive a recovery image from the recovery computer. The recovery image upon loading in the headless computer causes loading of software for recovery of the headless computer.

25 Claims, 4 Drawing Sheets

PERFORMING RECOVERY OF A HEADLESS COMPUTER

BACKGROUND

An error condition in a computer may prevent the computer from starting properly. A common example of such error condition is failure of storage media (typically a hard disk drive) in the computer, which prevents the computer from loading software (including operating system software) on the storage media for proper operation of the computer. Various issues exist that may prevent convenient recovery of certain computers that have experienced error conditions.

BRIEF DESCRIPTION OF THE DRAWINGS

Some embodiments of the invention are described with respect to the following figures.

DETAILED DESCRIPTION

Figure 1:
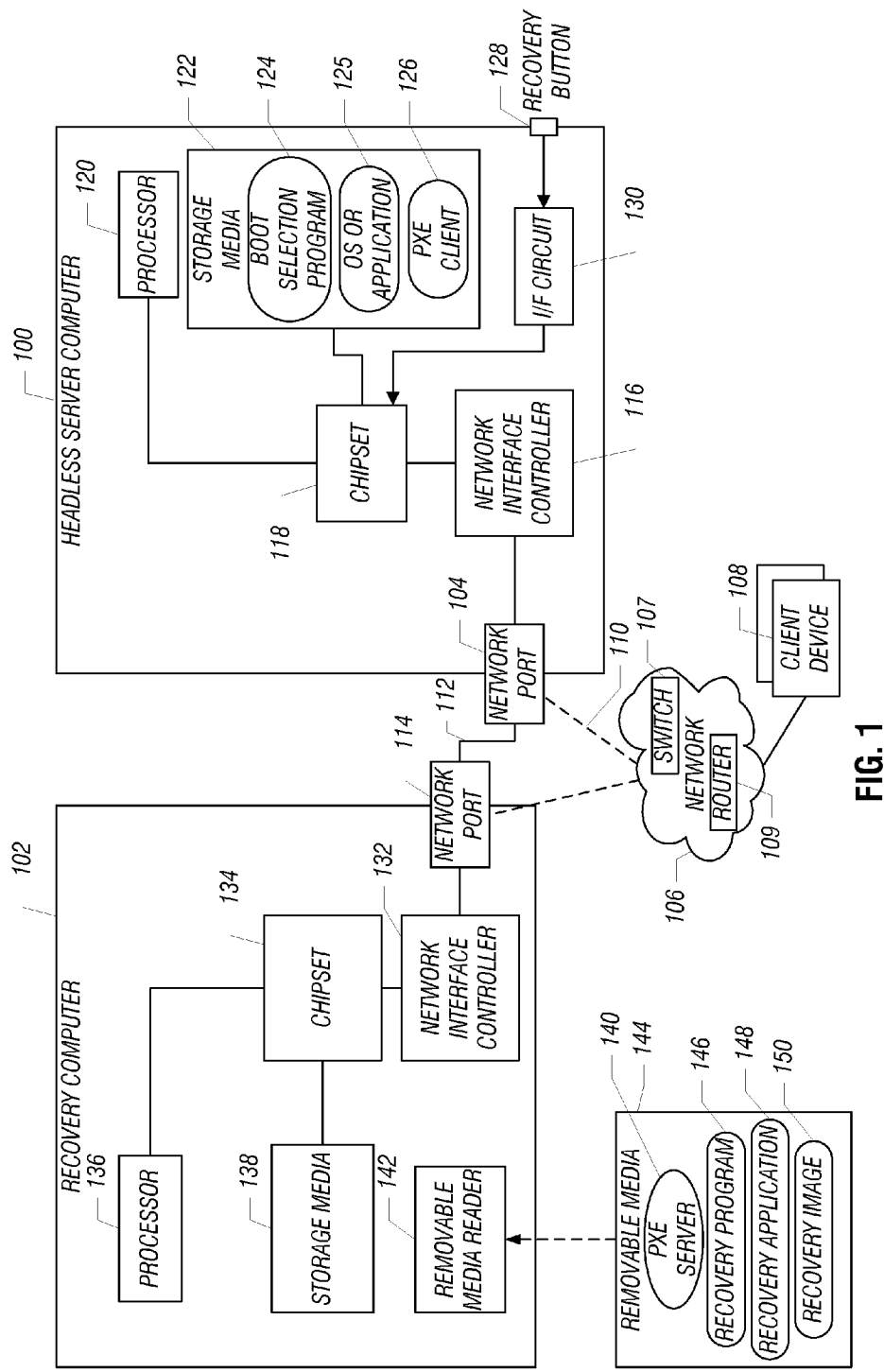
FIG. 1 is a block diagram of an example arrangement that includes a headless server computer and a recovery computer, in which techniques according to some embodiments can be employed.

When an error condition such as failure of a storage media such as a hard disk drive occurs on a typical personal computer (e.g., a desktop computer or notebook computer), a user can replace the storage media (or have the storage media repaired) and reload software on removable media, such as a compact disk (CD) or digital video disk (DVD), into the personal computer. However, the process of recovering a headless computer that has experienced an error condition is more complicated. A headless computer refers to a computer or appliance without external connections to typical user input devices (such as a keyboard or mouse) or a display device. Examples of headless computers include a headless server computer, a streaming media player, and so forth. Conventionally, to allow for recovery of a headless computer from an error condition, recovery software may have to be embedded in the headless computer when the headless computer is manufactured or assembled, which may increase the cost associated with the headless computer.

In the ensuing discussion, reference is made to a headless server computer. However, in other implementations, techniques according to some embodiments can be applied to other types of headless computers.

A headless server computer is usually used in a network environment, in which the headless server computer provides services to various client computers over a network. For example, the headless server computer can be a media server that can perform one or more of the following tasks: control backup of data stored on the client computers at the media server (where data on the client computers is copied to the media server for backup); provide data streaming, including streaming of audio and/or video data for output at the client computers (e.g., personal digital assistants, audio/video players, televisions, computers) over a network; and/or other tasks.

In accordance with some embodiments, a technique for recovering a headless server computer that has experienced an error condition (that prevents proper starting of the headless server computer) involves establishing a direct connection between the headless server computer and a recovery computer over a network link such that a network boot procedure can be performed between the headless server computer and the recovery computer for loading recovery components into the headless server computer. Establishing a direct connection means that the headless server computer communicates with the recovery computer, but not to any other computer. In one embodiment, a "direct connection" between the headless server computer and the recovery computer is a direct link (wired or wireless link) that does not involve any intermediate devices between the headless server computer and the recovery computer. In an alternative embodiment, a "direct connection" refers to a connection between the headless server computer and the recovery computer through a layer 2 switch.

One reason for establishing a direct connection between the recovery computer and the headless server computer is to avoid the issue of a network dynamic host configuration protocol (DHCP) server preventing successful completion of the network boot procedure. In some cases, the network boot procedure employs a network boot protocol, such as the PXE (Preboot Execution Environment) protocol that employs its own DHCP server, which cannot exist on the same network as the network DHCP server. Establishing the direct connection between the headless server computer and the recovery computer allows for isolation of the network DHCP server.

In accordance with some embodiments, the network boot procedure that is performed between the recovery computer and the headless server computer causes at least the following recovery components to be loaded into the headless server computer: a recovery application and a recovery image. The recovery application and recovery image may be initially stored on a removable storage media that can be loaded into the recovery computer for communication to the headless server computer over the direct connection between the recovery computer and headless server computer. Alternatively, the recovery application and the recovery image may be permanently installed on the recovery computer, such as on the hard disk drive of the recovery computer. As yet another alternative, the recovery computer may be able to access the recovery application and recovery image over a network, such as the Internet, from a support site, for example.

The network boot procedure causes network booting of the recovery application on the headless server computer. Upon execution of the recovery application on the headless server computer, the recovery application indicates its presence to the recovery computer using a particular protocol. After the recovery computer detects that the headless server computer has booted the recovery application, the recovery computer loads the recovery image (which may be initially stored on the removable media) into the headless server computer. The recovery image is used by the headless server computer to reload software (including operating system software) into the headless server computer for recovery of the headless server computer.

FIG. 1 illustrates an exemplary arrangement that includes a headless server computer 100 and a recovery computer 102. As shown in FIG. 1, the headless server computer 100 has a network port 104 that is connectable to a network 106, which can be connected to various client devices 108. The client devices 108 (e.g., personal computers, personal digital assistants, etc.) can access the headless server computer 100 over the network 106 to access various services.

A dashed line 110 for representing a connection between the network 106 and the network port 104 of the headless server computer 100 is used to indicate that the headless server computer 100 can be disconnected from the network 106, such that the headless server computer 100 can be connected over a network link 112 to the recovery computer 102. A similar dashed line is provided between the network port 114 of the recovery computer 102 and the network 106 to represent that the recovery computer 102 can also be disconnected from the network 106. The headless server computer 100 (and the recovery computer 102) can be disconnected from the network 106 if it is detected that the headless server computer 100 has experienced an error condition that prevents the headless server computer 100 from starting properly. Under normal operating conditions, the headless server computer 100 is connected to the network 106 for use by the client devices 108. However, in a failure condition, the headless server computer 100 is disconnected from the network 106 for connection to the recovery computer 102.

"Disconnecting" the headless server computer 100 from the network 106 can refer to one or more of the following: physically disconnecting a cable between the headless server computer 100 and a network device (e.g., switch, router, etc.) in the network 106; setting a state of the network device in the network 106 to perform electrical isolation between the headless server computer 100 and the network 106; or any other type of disconnection.

The connection between the headless server computer 100 and the recovery computer 102 is a direct network connection established over the network link 112 between the network port 104 of the headless server computer 100 and a network port 114 of the recovery computer 102. The network ports 104 and 112 can be Ethernet ports, in one implementation. In such implementation, the network link 112 can be an Ethernet cable. In alternative implementations, the network link 112 and network ports 104 and 112 can be according to other protocols (e.g., wireless or power-line networking).

In the embodiment discussed above, the direct connection between the headless server computer 100 and the recovery computer 102 is a direct link (wired or wireless link) that does not involve any intermediate devices between the headless server computer and the recovery computer. In an alternative embodiment, a "direct connection" refers to a connection through a layer 2 switch, such as layer 2 switch 107 in the network 106 of FIG. 1. The layer 2 switch 107 differs from a layer 3 router 109 that is also part of the network 106. The layer 2 switch 107 performs forwarding of data packets in the network 106 using layer 2 frame addresses, such as Ethernet addresses. On the other hand, the layer 3 router 109 routes data packets using Internet Protocol (IP) addresses. In this embodiment, during normal operation, the switch 107 is connected to the router 109, such that the headless server computer 100 is able to communicate with any device on the network 106. However, in case of failure that involves recovery of the headless server computer 100, the switch 107 can be disconnected from the router 109, such that a connection is established between the headless server computer 100 and a recovery computer 102 through the switch 107, while isolating the router 109. Note that in many implementations, the network DHCP server is typically provided on the router 109. Disconnecting the switch 107 from the router 109 allows the DHCP server on the router 109 to be isolated. More generally, access of a network DHCP server is typically performed through the router 109, such that disconnection of the switch 107 from the router 109 would isolate the headless server computer 100 and recovery computer 102 from the network DHCP server.

The headless server computer 100 includes a network interface controller 116 that is connected to the network port 104. The network interface controller 116 implements various communications protocols (such as an Ethernet protocol, Internet Protocol, etc.) to allow for communication over a network connection. Inside the headless server computer 100, the network interface controller 116 is connected to a chipset 118, which can include one or more integrated circuit (IC) devices to perform various functions. The headless server computer 100 also includes a processor 120 and a storage media 122 (including one or more disk-based storage devices and/or one or more memory devices).

As further shown in FIG. 1, the headless server computer 100 includes a boot selection program (e.g., a BIOS routine) 124, an operating system (OS) or application program 125, and a PXE (Preboot Execution Environment) client 126 that are initially stored in the storage media 122. The boot selection program 124, OS or application 125, and PXE client 126 can be loaded for execution on the processor 120. The PXE client 126 is used for performing network booting of the headless server computer 100. PXE refers to an environment to boot a computer over a network, where the network boot allows for loading of software to successfully start the computer. PXE is described in the Preboot Execution Environment (PXE) Specification, Version 2.1 (September 1999). In other embodiments, other protocols for performing the loading of recovery software from a remote computer can be employed.

The boot selection program 124 is used for booting the headless server computer 100. During normal operation, the boot selection program 124 performs initialization of electronic devices in the headless server computer 100, and loads operating system software and other software for normal operation of the headless server computer 100.

However, if an error condition is detected that prevents successful starting of the headless server computer 100 (such as due to failure of the storage media storing the OS 125), the boot selection program 124 can restart or automatically initiate the headless server computer 100 in recovery mode. Note that the failed component of the storage media 122 (which can include several components such as a hard disk drive, flash memory, optical storage, etc.) or other failed component of the headless server computer 100 may first have been replaced (or repaired) before the headless server computer 100 is restarted or initiated in recovery mode. Recovery mode can also be initiated by the user activating some type of an indication, such as by pressing a recovery button 128 on the headless server computer 100 (or some other activatable element). Activation of the recovery button 128 is detected by an interface circuit 130 which is connected to the chipset 118. Thus, when the headless server computer 100 starts (under control of the boot selection program 124), and the recovery button 128 is depressed, then the boot selection program 124 will detect an indication from the chipset 118 that the recovery button 128 is depressed. This causes the boot selection program 124 to boot the headless server computer 100 in recovery mode.

The boot selection program 124, when started in recovery mode, will also invoke the PXE client 126 to enable the performance of a network boot for purposes of recovering the headless server computer 100 by communicating with the recovery computer 102, as discussed further below.

The recovery computer 102 includes a network interface controller 132 that is connected to the network port 114. The network interface controller 132 is connected to a chipset 134 in the recovery computer 102. The recovery computer 102 also includes a processor 136 and storage media 138.

The recovery computer 102 also includes a removable media reader 142 that is for receiving and reading a removable media 144. In one embodiment, the removable media reader 142 is an optical disk reader, such as a CD or DVD reader for reading CD or DVD media. Alternatively, the removable media reader 142 can be a flash memory device reader for reading flash media.

The removable media 144 (which can be an optical media, flash media, or other type of storage media) can store various recovery components that are used to recover the headless server computer 100. The removable media 144 stores a PXE server 140 that can be invoked in the recovery computer 102 for execution on the processor 136. The PXE server 140 upon execution cooperates with the PXE client 126 in the headless server computer 100 to perform network booting of the headless server computer 100. Alternatively, the PXE server 140 can initially be stored in the storage media 138 or stored at a remote location.

The removable media 144 also contains a recovery program 146 that is executable in the recovery computer 102. The recovery program 146 can automatically start in the recovery computer 102 upon loading of the removable media 144 in the removable media reader 142, or alternatively, the recovery program 146 can be manually started in response to user command.

The removable media 144 also stores a recovery application 148 that is to be loaded from the recovery computer 102 to the headless server computer 100 for execution on the headless server computer 100. The loading of the recovery application 148 from the recovery computer 102 to the headless server computer 100 is performed as part of the network boot procedure performed by the PXE client 126 and PXE server 140.

Although reference is made to a recovery "program" 146 for execution in the recover computer 102 and a recovery "application" 148 for execution on the headless server computer 100, note that the terms "program" and "application" are intended to be synonymous, and refer to any software routine executable in a computer.

The removable media 144 also stores a recovery image 150, which stores software (including operating system software, application software, and so forth) that is to be loaded in the headless server computer 100 for proper operation. The recovery image 150 is provided to the headless server computer 100 after the recovery application 148 has been loaded into and executed in the headless server computer 100.

Any one or more of the recovery program 146, recovery application 148, and recovery image 150 can alternatively be stored on the storage media 138 in the recovery computer 102 (rather than on the removable media 144). As yet another implementation, any one or more of the recovery program 146, recovery application 148, and recovery image 150 can be stored remotely at a remote site for access over the Internet, for example.

Figure 2:
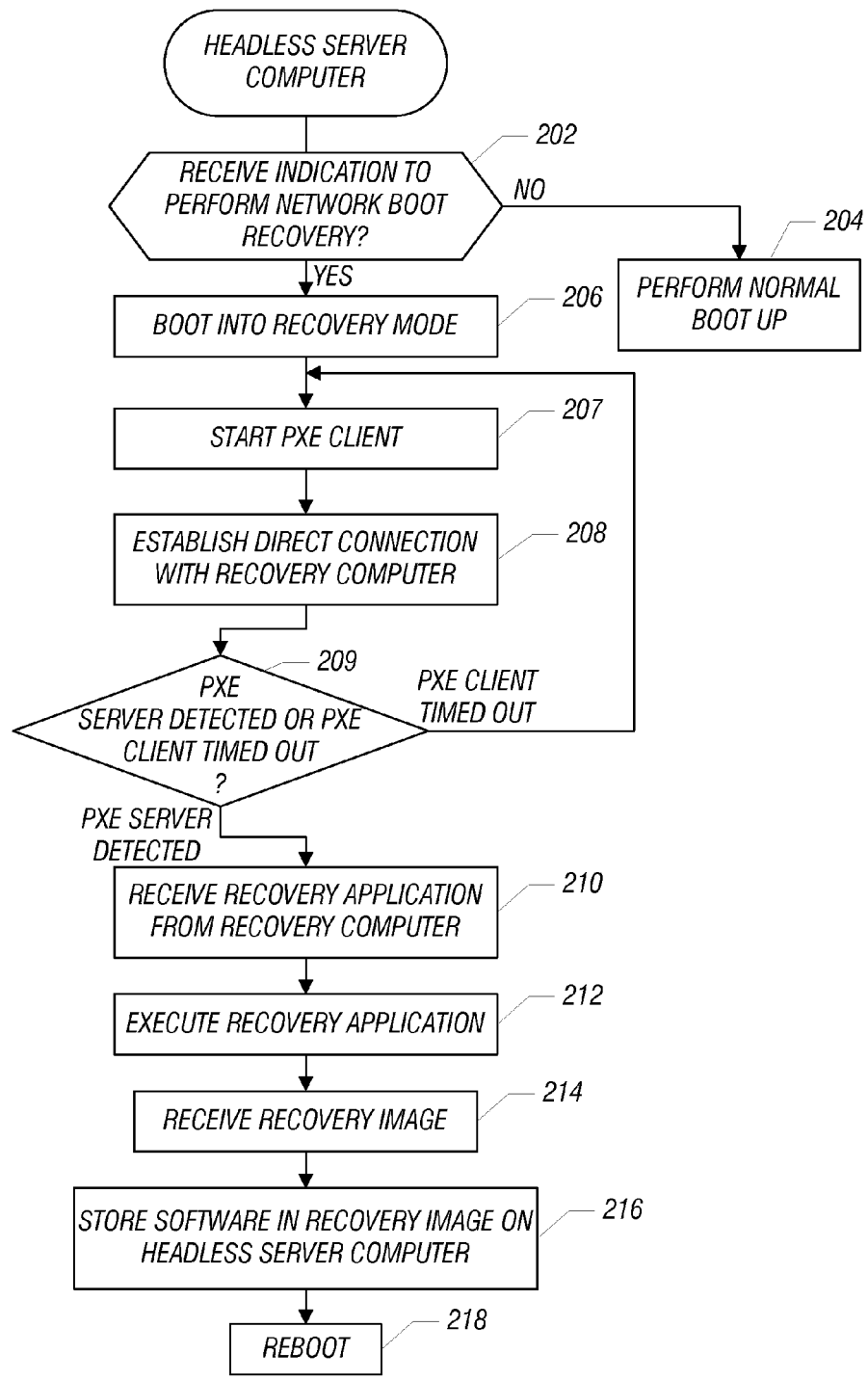
FIG. 2 is a flow diagram of a process of recovering a headless server computer, according to an embodiment.

FIG. 2 is a flow diagram of a general process performed by the headless server computer 100 according to an embodiment. Upon booting, the headless server computer 100 determines (at 202) whether an indication has been received to perform a network boot recovery procedure. This indication can alternatively be responsive to a detection of no other bootable media. This indication can be responsive to activation of the recovery button 128 depicted in FIG. 1. Detection of this indication can be performed by the boot selection program 124 of FIG. 1. If an indication to perform a network boot recovery procedure has not been received, then a normal boot operation is performed (at 204) by the boot selection program 124.

On the other hand, if an indication has been received to perform the network boot recovery procedure, then the boot selection program 124 boots (at 206) the headless server computer 100 into recovery mode, in which the PXE client 126 is started (at 207).

The headless server computer then establishes (at 208) a software connection with the recovery computer 102 over the network link 112 (FIG. 1). If the headless server computer 100 is connected to a network (such as network 106 in FIG. 1), the headless server computer 100 can be physically disconnected from the network by a user to allow for establishment of the direct connection to the recovery computer 102. To establish the direct connection with the recovery computer 102, in accordance with one embodiment, a network cable is used to connect the network port 104 of the headless server computer 100 to the network port 114 of the recovery computer 102. If the network ports 104 and 114 are Ethernet ports, then the associated network interface controllers 116 and 132 in the corresponding headless server computer 100 and recovery computer 102 would be able to perform an autosensing procedure in which the network interface controllers 116 and 132 are able to detect each other's presence and to configure the network interface controllers 116 and 132 with the appropriate transmit and receive connections. When connected, the network interface controllers 116 and 132 can exchange information with each other in the autosensing procedure to agree on compatible settings.

In other implementations, other mechanisms for establishing a direct connection between the headless server computer 100 and the recovery computer 102 can be performed, including use of wireless direct connections. As yet another alternative, the direct connection can be established by disconnecting the switch 107 from the router 109 (such that devices other than the headless server computer 100 and recovery computer 102 are isolated).

Once the direct connection is established, the headless server computer 100 and the recovery computer 102 can communicate with each other. At this point, it is possible to perform a PXE network boot procedure between the PXE client 126 and the PXE server 140 (once the PXE server 140 is started in the recovery computer 102). It is determined (at 209) whether the PXE server 140 is detected or the PXE client 126 has timed out. Note that in some implementations, the PXE client 126 is unable to wait indefinitely for the PXE server 140—in such implementations, the PXE client 126 would time out after some predefined period of time (at which time the PXE client 126 will exit). If the PXE client 126 has timed out and exited, control proceeds back to task 207, where the PXE client 126 is re-started (at 207) by the boot selection program 124 in the headless server computer 100. Note that some delay can be predefined between timeout of the PXE client 126 and the next re-starting of the PXE client 126. Tasks 208 and 209 are then repeated. However, once the PXE server 140 starts and the PXE client 126 detects (at 209) the PXE server 140, the process proceeds to task 210.

In some embodiments, the PXE client 126 can be programmed to be re-started some programmable number of times before the PXE client 126 stops waiting for the PXE server 140. The programmable number of retries can be specified in settings associated with the boot selection program 124. Alternatively, re-invocation of the PXE client 126 can be retried an indefinite number of times until the PXE server 140 is detected.

Figure 3:
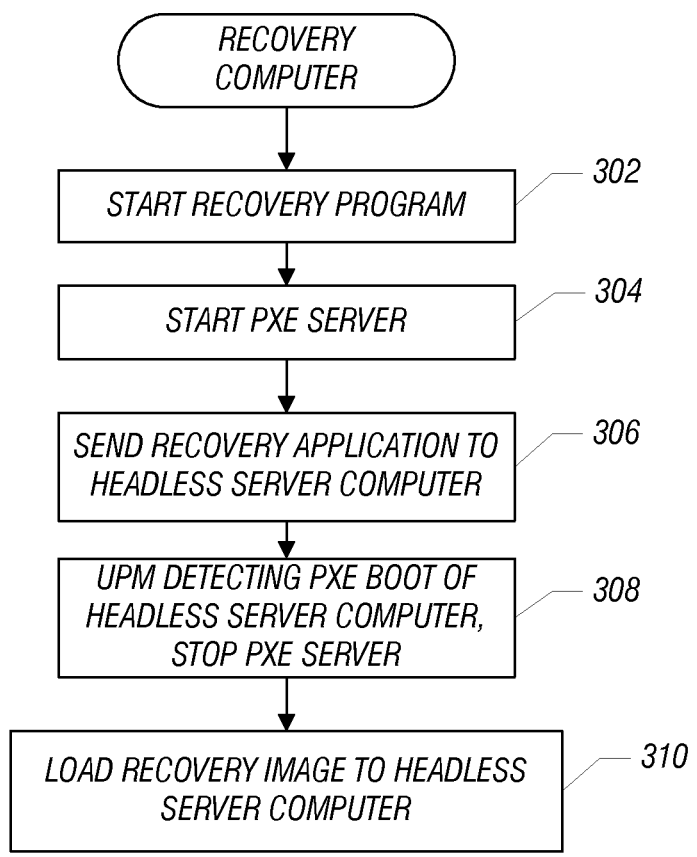
FIG. 3 is a flow diagram of a process performed at a recovery computer, according to an embodiment.

The following discussion makes reference to FIGS. 2 and 3 together. As shown in FIG. 3, as part of the recovery procedure, a user at the recovery computer 102 can install a removable media (e.g., removable media 144 in FIG. 1) into the recovery computer 102. The recovery media 144 contains a recovery program 146, a recovery application 148, and a recovery image 150. Loading of the removable media 144 into the recovery computer 102 causes the recovery program 146 to be started (at 302) in the recovery computer 102. The recovery program 146 may include a verification and/or authentication mechanism to ensure that the user that is using the recovery computer 102 to recover the headless server computer 102 actually has authorization to perform such recovery. This verification and/or authentication mechanism can involve use of a password or some other verification and/or authentication mechanism.

The recovery program 146 then starts (at 304) the PXE server 140 in the recovery computer 102. The PXE server 140 interacts with the PXE client 126 on the headless server computer 100 to negotiate a network boot of the headless server computer 100. As part of the network boot procedure, the recovery application 148 on the recovery media 144 is retrieved by the recovery computer 102 and sent (at 306) to the headless server computer 100.

As further shown in FIG. 2, the recovery application 148 is received (at 210) by the headless server computer 100. The recovery application 148 is executed (at 212) in the headless server computer 100. The recovery application 148 that executes in the headless server computer 100 can use one of various different mechanisms to cause the recovery image 150, which may be stored on the removable media 144 (FIG. 1) to be loaded from the recovery computer 102 to the headless server computer 100. In one implementation, the recovery application 148 can broadcast its presence using a particular network port or protocol. The recovery computer 102 detects this broadcast. Alternatively, the recovery application 148 can open a socket and wait for the recovery program 146 in the recovery computer 102 to contact the recovery application 148 (or vice versa).

In any case, as further shown in FIG. 3, the recovery program 146 in the recovery computer 102 detects that the headless server computer 100 has booted from the PXE server 140, and in response the recovery program 146 stops (at 308) the PXE server 140 in the recovery computer 102. Next, the recovery program 146 loads (at 310) the recovery image 150 from the removable media 144 to the headless server computer 100. To accomplish this, the recovery program 146 can use a standard protocol (such as Trivial File Transfer Protocol or TFTP) to transfer the recovery image 150 to the headless server computer 100.

As further shown in FIG. 2, the recovery application 148 in the headless server computer 100 receives (at 214) the recovery image 150, and stores (at 216) software in the recovery image on the headless server computer 100. At this point, a reboot (at 218) of the headless server computer 100 can be initiated, at which point the headless server computer 100 is considered to be recovered.

Figure 4:
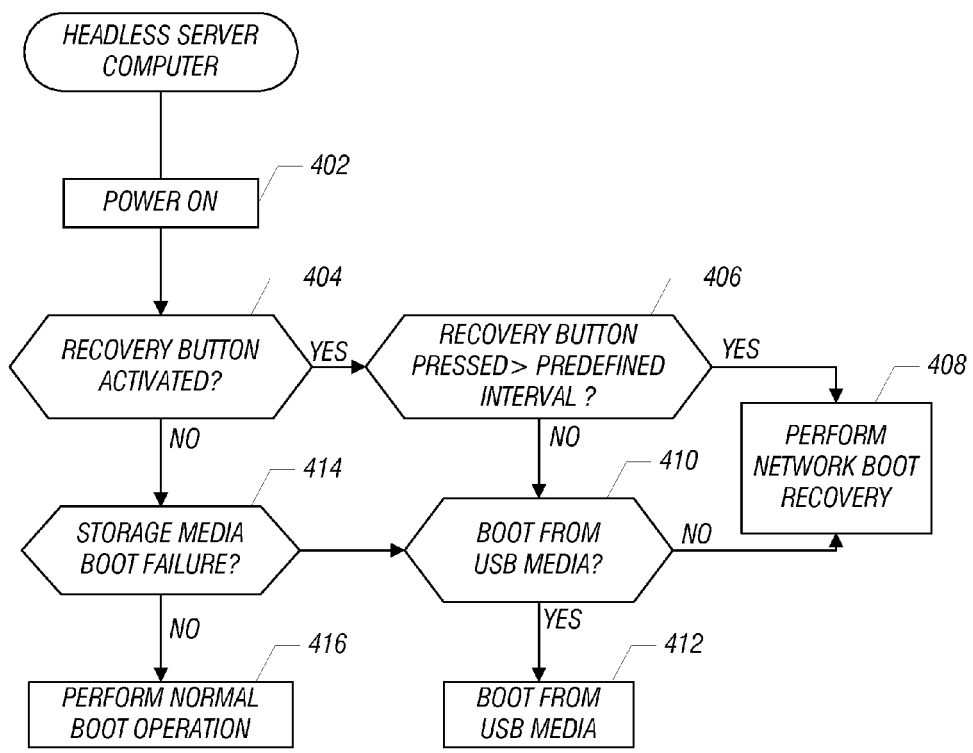
FIG. 4 is a flow diagram of an alternative process of performing recovery of a headless server computer, according to another embodiment.

FIG. 4 is a flow diagram of a procedure according to an alternative embodiment performed by the headless server computer 100. The headless server computer 100 powers on (at 402). The headless server computer 100 then detects (at 404) whether the recovery button 128 (FIG. 1) is activated. If so, the headless server computer 100 determines (at 406) whether the recovery button 128 has been pressed for greater than a predefined time interval (e.g., 3 seconds, 4 seconds, 5 seconds, etc.). If so, a network boot recovery procedure is performed (at 408) similar to the network boot recovery procedure described above in connection with FIGS. 2 and 3.

However, if the recovery button 128 is not pressed for greater than the predefined time interval, as determined at 406, then the headless server computer 100 determines (at 410) whether it is possible to boot from a USB (Universal Serial Bus) media (or other type of removable media). If not, then the network boot recovery procedure is performed (at 408). However, if it is determined (at 410) that it is possible to boot from the USB media, then a boot is performed (at 412) from the USB media.

In the decision block 404, if it is determined that the recovery button 128 has not been activated, then the headless server computer 100 proceeds with the boot procedure to attempt to boot from the storage media 122 (FIG. 1) in the headless server computer 100. The headless server computer 100 next determines (at 414) whether there is a failure with the storage media boot procedure. If not, a normal boot operation is performed (at 416) from the storage media 122. However, if the storage media boot procedure experienced a failure, then the headless server computer 100 determines (at 410) whether a boot from the USB media is possible, with further tasks (408 or 412) performed as discussed above.

By employing embodiments of the invention, one or more of the following benefits may be provided. A recovery application does not have to be embedded in the headless server computer 100, which helps reduce the cost of the headless server computer 100. Techniques according to some embodiments are also relatively simple to implement, while providing enhanced flexibility.

Instructions of software described above (including the boot selection program 124, operating system or application 125, PXE client 126, PXE server 140, recovery program 146, and recovery application 148 of FIG. 1) are loaded for execution on a processor (such as processors 120 and 136 in FIG. 1). The processor includes microprocessors, microcontrollers, processor modules or subsystems (including one or more microprocessors or microcontrollers), or other control or computing devices. As used here, a "processor" can refer to a single component or to plural components (e.g., one CPU or multiple CPUs).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes or can be downloaded over a network. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of performing recovery of a headless computer, comprising:
   establishing a direct connection by the headless computer with a recovery computer over a network link, wherein the direct connection is a direct link without any intermediate device between the headless computer and the recovery computer;
   after establishing the direct connection, initiating the headless computer in recovery mode;
   receiving, by the headless computer, a recovery routine from the recovery computer; and
   executing the recovery routine in the headless computer to implement a procedure to receive a recovery image from the recovery computer, the recovery image upon loading in the headless computer causing loading of software for recovery of the headless computer.

2. The method of claim 1, wherein establishing the direct connection with the recovery computer comprises using autosensing between a network interface controller of the headless computer and a network interface controller of the recovery computer.

3. The method of claim 2, wherein using autosensing comprises using Ethernet autosensing.

4. The method of claim 1, wherein receiving the recovery routine comprises receiving the recovery routine using a network boot procedure performed by the headless computer with the recovery computer.

5. The method of claim 1, wherein receiving the recovery routine comprises receiving the recovery routine using a Preboot Execution Environment (PXE) boot procedure performed by the headless computer with the recovery computer.

6. The method of claim 5, wherein performing the PXE boot procedure comprises performing the PXE boot procedure by a PXE client executing in the headless computer.

7. The method of claim 6, wherein performing the PXE boot procedure is performed based on interaction between the PXE client and a PXE server in the recovery computer, the method further comprising:
   upon starting of the PXE client, the PXE client waiting for detection of the PXE server, wherein the PXE client is configured to time out after a predefined time interval; and
   re-starting the PXE client after timeout of the PXE client, wherein re-starting of the PXE client is configured to be performed multiple times.

8. The method of claim 1, wherein receiving the recovery routine comprises receiving the recovery routine stored on a removable media that is loaded into a removable media reader of the recovery computer.

9. The method of claim 8, further comprising:
   after initiating the headless computer in recovery mode, waiting, by the headless computer, for a Preboot Execution Environment (PXE) server to run on the recovery computer, wherein the PXE server is initiated in the recovery computer by starting of a recovery program stored on the removable media, wherein the recovery program is started on the recovery computer.

10. The method of claim 1, further comprising:
    upon executing the recovery routine, performing an action by the headless computer to indicate a presence of the recovery routine in the headless computer, wherein indicating the presence causes the recovery computer to load the recovery image into the headless computer.

11. The method of claim 1, wherein establishing the direct connection comprises establishing a wireless direct connection between the headless computer and the recovery computer.

12. The method of claim 1, wherein establishing the direct connection comprises establishing the direct connection that is isolated from a network DHCP (dynamic host configuration protocol) server.

13. The method of claim 1, wherein establishing the direct connection comprises establishing the direct connection using a cable between the headless computer and the recovery computer.

14. A recovery computer comprising:
    a network interface to establish a wireless direct connection with a headless computer; and
    a processor to:
       receive first and second recovery routines;
       execute the first recovery routine;
       perform a network boot procedure with the headless computer to boot the second recovery routine on the headless computer; and
       after booting the second recovery routine on the headless computer, load a recovery image into the headless computer over the wireless direct connection to recover the headless computer.

15. The recovery computer of claim 14, further comprising:
    a removable media reader to receive a removable media storing the first and second recovery routines and the recovery image, wherein the first recovery routine is executed in response to receiving and reading the removable media in the removable media reader.

16. The recovery computer of claim 14, further comprising:
    a Preboot Executing Environment (PXE) server to be initiated by running the first recovery routine in the recovery computer.

17. The recovery computer of claim 14, wherein the first recovery routine is responsive to detecting network boot of the headless computer to load the recovery image into the headless computer.

18. The recovery computer of claim 14, wherein the first recovery routine is executable to detect presence of the second recovery routine in the headless computer.

19. The recovery computer of claim 14, wherein the wireless direct connection is a direct link without any intermediate device between the recovery computer and the headless computer.

20. An article comprising at least one computer-readable storage medium containing instructions that upon execution by a headless computer cause the headless computer to:
    detect an indication to initiate the headless computer in recovery mode;
    in response to detecting the indication, start a software module to enable performance of a network boot procedure over a direct connection established between the headless computer and a recovery computer, wherein the direct connection is a direct link without any intermediate device between the headless computer and the recovery computer; and
    in response to receiving a recovery routine as part of the network boot procedure, execute the recovery routine to interact with the recovery computer to retrieve a recovery image over the direct connection from the recovery computer.

21. The article of claim 20, wherein the network boot procedure is a Preboot Executable Environment (PXE) boot procedure.

22. The article of claim 20, wherein the recovery routine is to interact with a second recovery routine executing in the recovery computer, wherein the recovery routines are initially stored on a removable media readable by a reader of the recovery computer.

23. The article of claim 20, wherein establishment of the direct connection is enabled by using autosensing between network interface controllers in the headless computer and the recovery computer.

24. The article of claim 20, wherein the direct connection is a wireless direct connection.

25. The article of claim 20, wherein the direct connection is isolated from a network DHCP (dynamic host configuration protocol) server.

* * * * *